(12) United States Patent
Seow et al.

(10) Patent No.: US 12,032,909 B2
(45) Date of Patent: *Jul. 9, 2024

(54) PERCEPTUAL ASSOCIATIVE MEMORY FOR A NEURO-LINGUISTIC BEHAVIOR RECOGNITION SYSTEM

(71) Applicant: Intellective Ai, Inc., Dallas, TX (US)

(72) Inventors: Ming-Jung Seow, The Woodlands, TX (US); Gang Xu, Katy, TX (US); Tao Yang, Katy, TX (US); Wesley Kenneth Cobb, The Woodlands, TX (US)

(73) Assignee: Intellective Ai, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,331

(22) Filed: Sep. 20, 2021

(65) Prior Publication Data

US 2022/0075946 A1 Mar. 10, 2022

Related U.S. Application Data

(63) Continuation of application No. 16/522,915, filed on Jul. 26, 2019, now abandoned, which is a
(Continued)

(51) Int. Cl.
*G06F 40/30* (2020.01)
*G06F 40/242* (2020.01)
(Continued)

(52) U.S. Cl.
CPC .......... *G06F 40/284* (2020.01); *G06F 40/242* (2020.01); *G06F 40/40* (2020.01)

(58) Field of Classification Search
CPC ...... G06F 40/284; G06F 40/289; G06F 40/30; G06F 21/554; G06F 11/327; G06F 7/18; G06F 40/216; G06N 7/005
See application file for complete search history.

(56) References Cited

U.S. PATENT DOCUMENTS

| 4,679,077 A | 7/1987 | Yuasa et al. |
| 5,113,507 A | 5/1992 | Jaeckel |

(Continued)

FOREIGN PATENT DOCUMENTS

| CN | 1623146 A | 6/2005 |
| CN | 1670728 A | 9/2005 |

(Continued)

OTHER PUBLICATIONS

Apewokin et al. "Multimodal Mean Adaptive Backgrounding for Embedded Real-Time Video Surveillance," Jun. 2007, IEEE 6 pages, Minneapolis, MN.
(Continued)

*Primary Examiner* — Olujimi A Adesanya
(74) *Attorney, Agent, or Firm* — COOLEY LLP (57) ABSTRACT

Techniques are disclosed for generating a syntax for a neuro-linguistic model of input data obtained from one or more sources. A stream of words of a dictionary built from a sequence of symbols are received. The symbols are generated from an ordered stream of normalized vectors generated from input data. Statistics for combinations of words co-occurring in the stream are evaluated. The statistics includes a frequency upon which the combinations of words co-occur. A model of combinations of words based on the evaluated statistics is updated. The model identifies statistically relevant words. A connected graph is generated. Each node in the connected graph represents one of the words in the stream. Edges connecting the nodes represent a probabilistic relationship between words in the stream. Phrases are identified based on the connected graph.

20 Claims, 6 Drawing Sheets

Related U.S. Application Data continuation of application No. 14/569,161, filed on Dec. 12, 2014, now Pat. No. 10,409,910.

(51) Int. Cl.
 *G06F 40/284* (2020.01)
 *G06F 40/40* (2020.01)
 *G06N 20/00* (2019.01)

(56) References Cited

U.S. PATENT DOCUMENTS

| | | | |
|---|---|---|---|
| 5,317,507 A | 5/1994 | Gallant | |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,085,716 B1* | 8/2006 | Even | G10L 15/22 |
| | | | 704/E15.04 |
| 7,136,525 B1 | 11/2006 | Toyama et al. | |
| 7,143,091 B2* | 11/2006 | Charnock | G06F 16/34 |
| | | | 707/999.005 |
| 7,158,680 B2 | 1/2007 | Pace | |
| 7,171,358 B2 | 1/2007 | Whittaker et al. | |
| 7,200,266 B2 | 4/2007 | Ozer et al. | |
| 7,227,893 B1 | 6/2007 | Srinivasa et al. | |
| 7,391,907 B1 | 6/2008 | Venetianer et al. | |
| 7,421,660 B2* | 9/2008 | Charnock | G06F 16/358 |
| | | | 715/753 |
| 7,436,887 B2 | 10/2008 | Yeredor et al. | |
| 7,519,589 B2 | 4/2009 | Charnock et al. | |
| 7,636,730 B2* | 12/2009 | Sanfilippo | G06F 16/355 |
| | | | 707/999.102 |
| 7,825,954 B2 | 11/2010 | Zhang et al. | |
| 7,868,912 B2 | 1/2011 | Venetianer et al. | |
| 7,877,258 B1* | 1/2011 | Chelba | G06F 40/216 |
| | | | 704/240 |
| 8,131,012 B2 | 3/2012 | Eaton et al. | |
| 8,316,030 B2 | 11/2012 | Koperda et al. | |
| 8,819,024 B1* | 8/2014 | Toderici | G06V 20/41 |
| | | | 707/754 |
| 9,195,829 B1* | 11/2015 | Goradia | G06F 21/55 |
| 9,507,768 B2 | 11/2016 | Cobb et al. | |
| 9,639,521 B2 | 5/2017 | Seow et al. | |
| 9,672,203 B1 | 6/2017 | Bhar et al. | |
| 9,973,523 B2 | 5/2018 | Cobb et al. | |
| 10,002,177 B1 | 6/2018 | McClintock et al. | |
| 10,187,415 B2 | 1/2019 | Seow et al. | |
| 10,409,909 B2 | 9/2019 | Xu et al. | |
| 10,409,910 B2 | 9/2019 | Seow et al. | |
| 11,017,168 B2 | 5/2021 | Xu et al. | |
| 11,847,413 B2 | 12/2023 | Xu | |
| 2002/0032564 A1 | 3/2002 | Ehsani et al. | |
| 2003/0036900 A1 | 2/2003 | Weise | |
| 2003/0107650 A1 | 6/2003 | Colmenarez et al. | |
| 2003/0130976 A1 | 7/2003 | Au | |
| 2003/0228058 A1 | 12/2003 | Xie et al. | |
| 2004/0088723 A1* | 5/2004 | Ma | H04N 21/25891 |
| | | | 725/19 |
| 2004/0151342 A1 | 8/2004 | Venetianer et al. | |
| 2005/0001759 A1 | 1/2005 | Khosla | |
| 2005/0055199 A1 | 3/2005 | Ryzchachkin et al. | |
| 2005/0105765 A1 | 5/2005 | Han et al. | |
| 2005/0108001 A1* | 5/2005 | Aarskog | G06F 40/253 |
| | | | 704/10 |
| 2005/0240629 A1 | 10/2005 | Gu et al. | |
| 2006/0018516 A1 | 1/2006 | Masoud et al. | |
| 2006/0095521 A1 | 5/2006 | Patinkin | |
| 2006/0138338 A1 | 6/2006 | Tezuka et al. | |
| 2006/0156404 A1 | 7/2006 | Day | |
| 2006/0165386 A1 | 7/2006 | Garoutte | |
| 2006/0190419 A1 | 8/2006 | Bunn et al. | |
| 2006/0193516 A1 | 8/2006 | Toyama et al. | |
| 2006/0222206 A1 | 10/2006 | Garoutte | |
| 2007/0094066 A1 | 4/2007 | Kumar et al. | |
| 2007/0240207 A1* | 10/2007 | Belakhdar | G06F 21/552 |
| | | | 726/12 |
| 2007/0250898 A1 | 10/2007 | Scanlon et al. | |
| 2008/0002856 A1 | 1/2008 | Ma et al. | |
| 2008/0059187 A1 | 3/2008 | Roitblat et al. | |
| 2008/0109454 A1 | 5/2008 | Willse et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0195595 A1* | 8/2008 | Masuyama | G06F 16/313 |
| | | | 707/E17.084 |
| 2008/0240496 A1 | 10/2008 | Senior | |
| 2008/0247599 A1 | 10/2008 | Porikli et al. | |
| 2008/0250497 A1 | 10/2008 | Mullarkey et al. | |
| 2008/0252723 A1 | 10/2008 | Park | |
| 2009/0016599 A1 | 1/2009 | Eaton et al. | |
| 2009/0022364 A1 | 1/2009 | Swaminathan et al. | |
| 2009/0030891 A1* | 1/2009 | Skubacz | G06F 16/9558 |
| | | | 707/999.005 |
| 2009/0067716 A1 | 3/2009 | Brown et al. | |
| 2009/0094064 A1 | 4/2009 | Tyler et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0057509 A1 | 3/2010 | Kumar et al. | |
| 2010/0063949 A1 | 3/2010 | Eaton et al. | |
| 2010/0121572 A1 | 5/2010 | Berardi et al. | |
| 2010/0150471 A1 | 6/2010 | Cobb et al. | |
| 2010/0179838 A1 | 7/2010 | Basant et al. | |
| 2010/0198592 A1 | 8/2010 | Potter | |
| 2010/0293048 A1 | 11/2010 | Singolda et al. | |
| 2010/0312769 A1 | 12/2010 | Bailey et al. | |
| 2010/0322516 A1 | 12/2010 | Xu et al. | |
| 2011/0052067 A1 | 3/2011 | Cobb et al. | |
| 2011/0064267 A1 | 3/2011 | Cobb et al. | |
| 2011/0064268 A1 | 3/2011 | Cobb et al. | |
| 2011/0185234 A1 | 7/2011 | Cohen et al. | |
| 2012/0059776 A1 | 3/2012 | Estes | |
| 2012/0102033 A1 | 4/2012 | Sarshar et al. | |
| 2012/0117082 A1 | 5/2012 | Koperda et al. | |
| 2012/0137367 A1 | 5/2012 | Dupont et al. | |
| 2012/0166196 A1* | 6/2012 | Ju | G10L 15/19 |
| | | | 704/E15.005 |
| 2012/0179682 A1* | 7/2012 | De Saeger | G06F 16/243 |
| | | | 707/E17.09 |
| 2013/0031061 A1 | 1/2013 | Jagota | |
| 2013/0124435 A1 | 5/2013 | Estes | |
| 2013/0132311 A1 | 5/2013 | Liu et al. | |
| 2013/0135123 A1 | 5/2013 | Golander et al. | |
| 2013/0246322 A1 | 9/2013 | De Sousa Webber | |
| 2014/0016396 A1 | 1/2014 | Mazumder et al. | |
| 2014/0063247 A1 | 3/2014 | Bernal et al. | |
| 2014/0067377 A1 | 3/2014 | Reiter | |
| 2014/0163968 A1 | 6/2014 | Ehsani et al. | |
| 2014/0201126 A1 | 7/2014 | Zadeh et al. | |
| 2014/0229164 A1 | 8/2014 | Martens et al. | |
| 2014/0351267 A1 | 11/2014 | Kumar | |
| 2015/0046155 A1 | 2/2015 | Seow et al. | |
| 2015/0047040 A1 | 2/2015 | Cobb et al. | |
| 2015/0082437 A1 | 3/2015 | Dodson | |
| 2016/0142435 A1 | 5/2016 | Bernstein et al. | |
| 2016/0170961 A1 | 6/2016 | Seow et al. | |
| 2016/0170964 A1 | 6/2016 | Xu et al. | |
| 2016/0217133 A1 | 7/2016 | Reiter et al. | |
| 2017/0293608 A1 | 10/2017 | Seow et al. | |
| 2020/0193091 A1 | 6/2020 | Xu et al. | |

(56) References Cited

U.S. PATENT DOCUMENTS

2020/0193092 A1 6/2020 Seow et al.
2022/0012422 A1 1/2022 Xu et al.

FOREIGN PATENT DOCUMENTS

| CN | 104035917 A | 9/2014 |
|---|---|---|
| DE | 10062404 A1 | 6/2002 |
| EP | 2019383 A1 | 1/2009 |
| KR | 20080072673 A | 8/2008 |
| KR | 20090121309 A | 11/2009 |
| WO | WO-9641333 A1 | 12/1996 |
| WO | WO-0073936 A1 | 12/2000 |
| WO | WO-0137128 A2 | 5/2001 |
| WO | WO-2003034281 A1 | 4/2003 |
| WO | WO-2007064482 A1 | 6/2007 |
| WO | WO-2009049314 A2 | 4/2009 |
| WO | WO-2016094625 A1 | 6/2016 |
| WO | WO-2016094635 A1 | 6/2016 |

OTHER PUBLICATIONS

Connell, J. et al., "Detection and Tracking in the IBM PeopleVision System," IEEE ICME, Jun. 2004, pp. 1-4.
Elgammal et al. "Non-parametric Model for Background Subtraction," Computer Vision Laboratory, University of Maryland; Jun. 2000; 17 pages, College Park, MD.
Grabner, H. et al., "On-line Boosting and Vision," IEEE Conference on Computer Vision and Pattern Recognition (CVPR), 2006, vol. 1, pp. 260-267.
Haritaoglu et al., "W4: Real-Time Surveillance of People and Their Activities," IEEE Transactions on Pattern Analysis and Machine Intelligence, Aug. 2000, vol. 22, No. 8, pp. 809-830.
Haritaoglu, I. et al., "Ghost: A Human Body Part Labeling System Using Silhouettes," 14th Annual International Conference on Pattern Recognition, Aug. 16-20, 1998, Brisbane, Australia, pp. 77-82.
International Search Report and Written Opinion for International Application No. PCT/US2015/064931, dated Feb. 12, 2016, 9 pages.
International Search Report and Written Opinion for International Application No. PCT/US2015/064954, dated Feb. 26, 2016, 6 pages.
Ivanov et al., "Video Surveillance of Interactions," MIT Media Laboratory, Cambridge, MA, Jul. 1999, 8 pages, Fort Collins, Colorado, US.
Kanerva, P., Chapter 3: "Sparse Distributed Memory and Related Models," In M. H. Hassoun, ed., Associative Neural Memories: Theory and Implementation, 1993, pp. 50-76, New York: Oxford University Press.
Nock, R. et al., "Statistical Region Merging," IEEE Transactions on Pattern Analysis and Machine Intelligence, Nov. 2004, vol. 26(11):1452-1458.
Senior, A. et al., "Appearance Models for Occlusion Handling," IBM T. J. Watson Research Center, 2001, 8 pages, Yorktown, Heights, NY US.
Stauffer, C. et al., "Adaptive background mixture models for real-time tracking," Proceedings IEEE Conference on Computer Vision and Pattern Recognition, 1999: pp. 246-252.
Stauffer, C. et al., "Learning Patterns of Activity Using Real-Time Tracking," IEEE Transactions on Pattern Analysis and Machine Intelligence (TPAMI), Aug. 2000, vol. 22(8):747-757.
International Preliminary Report on Patentability for International Application No. PCT/US2015/064931, dated Jun. 22, 2017, 9 pages.
International Preliminary Report on Patentability for International Application No. PCT/US2015/064954, dated Jun. 22, 2017, 6 pages.

* cited by examiner

PERCEPTUAL ASSOCIATIVE MEMORY FOR A NEURO-LINGUISTIC BEHAVIOR RECOGNITION SYSTEM

CROSS-REFERENCE TO RELATED APPLICATIONS

This application is a continuation of U.S. patent application Ser. No. 16/522,915, filed Jul. 26, 2019, which is a continuation of U.S. patent application Ser. No. 14/569,161, filed Dec. 12, 2014, the contents of each which are hereby incorporated by reference in their entireties.

BACKGROUND

Field

Embodiments described herein generally relate to data analysis systems, and more particularly to building neuro-linguistic models of input data obtained from one or more data sources.

Description of the Related Art

Many currently available surveillance and monitoring systems (e.g., video surveillance systems, SCADA systems, and the like) are trained to observe specific activities and alert an administrator after detecting those activities.

However, such rules-based systems require advance knowledge of what actions and/or objects to observe. The activities may be hard-coded into underlying applications or the system may train itself based on any provided definitions or rules. In other words, unless the underlying code includes descriptions of certain behaviors or rules for generating an alert for a given observation, the system is incapable of recognizing such behaviors. Such a rules-based approach is rigid. That is, unless a given behavior conforms to a pre-defined rule, an occurrence of the behavior can go undetected by the monitoring system. Even if the system trains itself to identify the behavior, the system requires rules to be defined in advance for what to identify.

In addition, many surveillance systems, e.g., video surveillance systems, require a significant amount of computing resources, including processor power, storage, and bandwidth. For example, typical video surveillance systems require a large amount of computing resources per camera feed because of the typical size of video data. Given the cost of the resources, such systems are difficult to scale.

SUMMARY

One embodiment presented herein includes a method for generating a syntax for a neuro-linguistic model of input data obtained from one or more sources. The method generally includes receiving a stream of words of a dictionary built from a sequence of symbols. The symbols are generated from an ordered stream of normalized vectors generated from input data. Statistics for combinations of words co-occurring in the stream are evaluated. The statistics includes a frequency upon which the combinations of words co-occur. A model of combinations of words is updated based on the evaluated statistics. The model identifies statistically relevant words. A connected graph is generated. Each node in the connected graph represents one of the words in the stream. Edges connecting the nodes represent a probabilistic relationship between words in the stream. Phrases are identified based on the connected graph.

Another embodiment presented herein includes a computer-readable storage medium storing instructions, which, when executed on a processor, performs an operation generating a syntax for a neuro-linguistic model of input data obtained from one or more sources. The operation itself generally includes receiving a stream of words of a dictionary built from a sequence of symbols. The symbols are generated from an ordered stream of normalized vectors generated from input data. Statistics for combinations of words co-occurring in the stream are evaluated. The statistics includes a frequency upon which the combinations of words co-occur. A model of combinations of words is updated based on the evaluated statistics. The model identifies statistically relevant words. A connected graph is generated. Each node in the connected graph represents one of the words in the stream. Edges connecting the nodes represent a probabilistic relationship between words in the stream. Phrases are identified based on the connected graph.

Yet another embodiment presented herein includes a system having a processor and a memory storing one or more application programs configured to perform an operation for generating a syntax for a neuro-linguistic model of input data obtained from one or more sources. The operation itself generally includes receiving a stream of words of a dictionary built from a sequence of symbols. The symbols are generated from an ordered stream of normalized vectors generated from input data. Statistics for combinations of words co-occurring in the stream are evaluated. The statistics includes a frequency upon which the combinations of words co-occur. A model of combinations of words is updated based on the evaluated statistics. The model identifies statistically relevant words. A connected graph is generated. Each node in the connected graph represents one of the words in the stream. Edges connecting the nodes represent a probabilistic relationship between words in the stream. Phrases are identified based on the connected graph.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein describe a behavior recognition system. The behavior recognition system may be configured with one or more data collector components that collect raw data values from different data sources (e.g., video data, building management data, SCADA data). For example, a behavior recognition system may be configured for video surveillance. The behavior recognition system may include a data collector component that retrieves video frames in real-time, separates foreground objects from background objects, and tracks foreground objects from frame-to-frame. The data collector component may normalize the video frame data into numerical values (e.g., falling within a range from 0 to 1 with respect to a given data type).

In one embodiment, the behavior recognition system includes a neuro-linguistic module that performs neural network-based linguistic analysis on the collected data. Specifically, for each type of data monitored by a sensor, the neuro-linguistic module creates and refines a linguistic model of the normalized data. That is, the neuro-linguistic module builds a grammar used to describe the normalized data. The linguistic model includes symbols that serve as building blocks for the grammar. The neuro-linguistic module identifies combinations of symbols to build a dictionary of words. Once the dictionary is built, the neuro-linguistic module identifies phrases that include various combinations of words in the dictionary. The behavior recognition system uses such a linguistic model to describe what is being observed. The linguistic model allows the behavior recognition system to distinguish between normal and abnormal activity observed in the input data. As a result, the behavior recognition system can issue alerts whenever abnormal activity occurs.

To generate the linguistic model, a neuro-linguistic module receives normalized data values and organizes the data into clusters. The neuro-linguistic module evaluates statistics of each cluster and identifies statistically relevant clusters. Further, the neuro-linguistic module generates symbols, e.g., letters, corresponding to each statistically relevant cluster. Thus, input values mapping to a given cluster may correspond to a symbol.

The neuro-linguistic module generates a lexicon, i.e., builds a dictionary, of observed combinations of symbols, i.e., words, based on a statistical distribution of symbols identified in the input data. Specifically, the neuro-linguistic module may identify patterns of symbols in the input data at different frequencies of occurrence. Further, the neuro-linguistic module can identify statistically relevant combinations of symbols at different lengths (e.g., from one-symbol to a maximum-symbol word length). The neuro-linguistic module may include such statistically relevant combinations of symbols in a dictionary used to identify phrases for the linguistic model.

Using words from the dictionary, the neuro-linguistic module generates phrases based on probabilistic relationships of each word occurring in sequence relative to other words as additional data is observed. For example, the neuro-linguistic module may identify a relationship between a given three-letter word that frequently appears in sequence with a given four-letter word, and so on. The neuro-linguistic module determines a syntax based on the identified phrases.

The syntax allows the behavior recognition system to learn, identify, and recognize patterns of behavior without the aid or guidance of predefined activities. Unlike a rules-based surveillance system, which contains predefined patterns of what to identify or observe, the behavior recognition system learns patterns by generalizing input and building behavior memories of what is observed. Over time, the behavior recognition system uses these memories to distinguish between normal and anomalous behavior reflected in observed data.

For instance, the neuro-linguistic module builds letters, words, phrases, and estimates an "unusualness score" for each identified letter, word, or phrase. The unusualness score (for a letter, word, or phrase observed in input data) provides a measure of how infrequently the letter, word, or phrase has occurred relative to past observations. Thus, the behavior recognition system may use the unusualness scores to both measure how unusual a current syntax is, relative to a stable model of symbols (i.e., letters), a stable model of words built from the symbols (i.e., a dictionary) and a stable model of phrase built from the words (i.e., a syntax)—collectively the neuro-linguistic model.

As the neuro-linguistic module continues to receive input data, the neuro-linguistic module may decay, reinforce, and generate the letters, words, and syntax models. In parlance with the machine learning field, the neuro-linguistic module "learns on-line" as new data is received and occurrences a given type of input data either increases, decreases, appears, or disappears.

Figure 1:
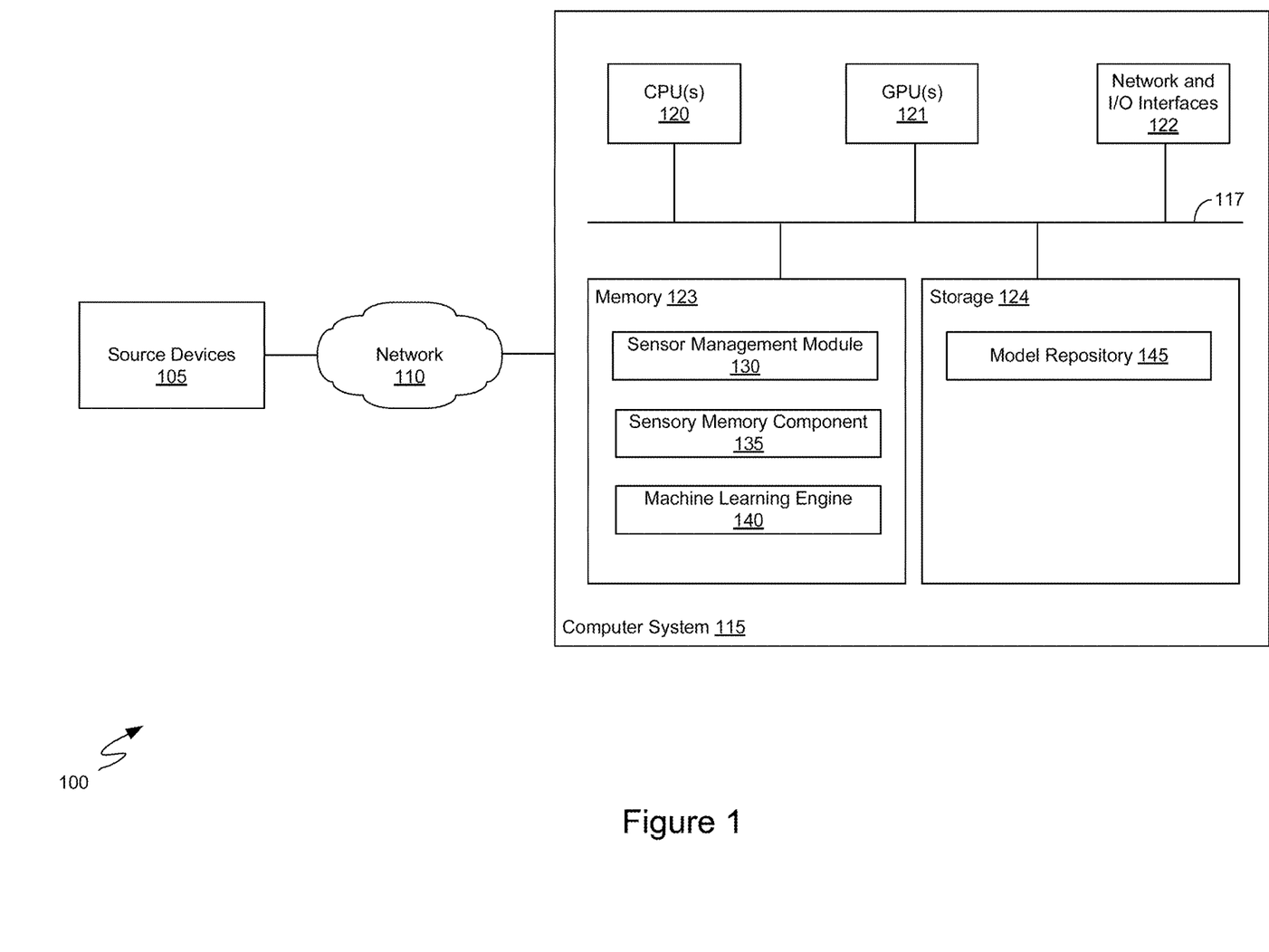
FIG. 1 illustrates an example computing environment for a neuro-linguistic behavior recognition system, according to one embodiment.

FIG. 1 illustrates components of a behavioral recognition system 100, according to one embodiment. As shown, the behavioral recognition system 100 includes one or more input source devices 105, a network 110, and one or more computer systems 115. The network 110 may transmit data input by the source devices 105 to the computer system 115. Generally, the computing environment 100 may include one or more physical computer systems 115 connected via a network (e.g., the Internet). Alternatively, the computer systems 115 may be cloud computing resources connected by the network. Illustratively, the computer system 115 includes one or more central processing units (CPU) 120, one or more graphics processing units (GPU) 121, network and I/O interfaces 122, a storage 124 (e.g., a disk drive, optical disk drive, and the like), and a memory 123 that includes a sensor management module 130, a sensory memory component 135, and a machine learning engine 140. The storage 124 includes a model repository 145.

The CPU 120 retrieves and executes programming instructions stored in the memory 123 as well as stores and retrieves application data residing in the storage 124. In one embodiment, the GPU 121 implements a Compute Unified Device Architecture (CUDA). Further, the GPU 121 is configured to provide general purpose processing using the parallel throughput architecture of the GPU 121 to more efficiently retrieve and execute programming instructions stored in the memory 123 and also to store and retrieve application data residing in the storage 124. The parallel throughput architecture provides thousands of cores for processing the application and input data. As a result, the GPU 121 leverages the thousands of cores to perform read and write operations in a massively parallel fashion. Taking advantage of the parallel computing elements of the GPU 121 allows the behavior recognition system 100 to better process large amounts of incoming data (e.g., input from a video and/or audio source). As a result, the behavior recognition system 100 may scale with relatively less difficulty.

The sensor management module 130 provides one or more data collector components. Each of the collector components is associated with a particular input data source, e.g., a video source, a SCADA (supervisory control and data acquisition) source, an audio source, etc. The collector components retrieve (or receive, depending on the sensor) input data from each source at specified intervals (e.g., once a minute, once every thirty minutes, once every thirty seconds, etc.). The sensor management module 130 controls the communications between the data sources. Further, the sensor management module 130 normalizes input data and sends the normalized data to the sensory memory component 135.

The sensory memory component 135 is a data store that transfers large volumes of data from the sensor management module 130 to the machine learning engine 140. The sensory memory component 135 stores the data as records. Each record may include an identifier, a timestamp, and a data payload. Further, the sensory memory component 135 aggregates incoming data in a time-sorted fashion. Storing incoming data from each of the data collector components in a single location where the data may be aggregated allows the machine learning engine 140 to process the data efficiently. Further, the computer system 115 may reference data stored in the sensory memory component 135 in generating alerts for anomalous activity. In one embodiment, the sensory memory component 135 may be implemented in via a virtual memory file system in the memory 123. In another embodiment, the sensory memory component 135 is implemented using a key-value share.

The machine learning engine 140 receives data output from the sensor management module 135. Generally, components of the machine learning engine 140 generate a linguistic representation of the normalized vectors. As described further below, to do so, the machine learning engine 140 clusters normalized values having similar features and assigns a distinct symbol to each cluster. The machine learning engine 140 may then identify recurring combinations of symbols (i.e., words) in the data. The machine learning engine 140 then similarly identifies recurring combinations of words (i.e., phrases) in the data.

Note, however, FIG. 1 illustrates merely one possible arrangement of the behavior recognition system 100. For example, although the input data sources 105 are shown connected to the computer system 115 via network 110, the network 110 is not always present or needed (e.g., an input source such as a video camera may be directly connected to the computer system 115).

Figure 2:
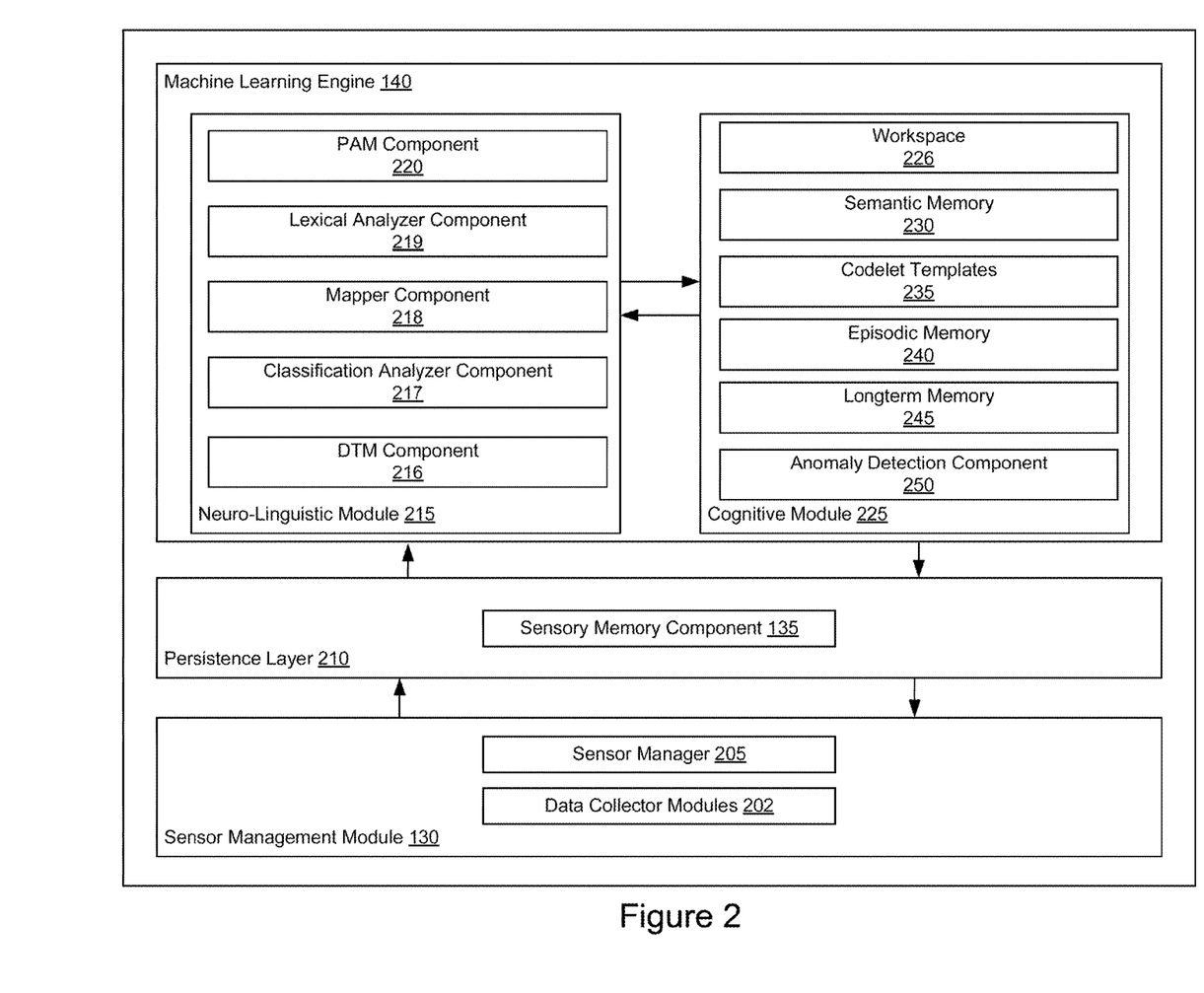
FIG. 2 illustrates a system architecture of a neuro-linguistic behavior recognition system, according to one embodiment.

FIG. 2 illustrates a system architecture of the behavior recognition system, according to one embodiment. As shown, the sensor management module 130 and the machine learning engine 140 communicate via a persistence layer 210.

The persistence layer 210 includes data stores that maintain information used by components of the computer system 115. For example, the persistence layer 210 includes data stores that maintain information describing properties of the data collector modules 202, system properties (e.g., serial numbers, available memory, available capacity, etc. of the computer system 115), and properties of the source driver (e.g., active plug-ins 118, active sensors associated with each data source, normalization settings, etc.). Other data stores may maintain learning model information, system events, and behavioral alerts. In addition, the sensory memory component 135 resides in the persistence layer 210.

The machine learning engine 140 itself includes a neuro-linguistic module 215 and a cognitive module 225. The neuro-linguistic module 215 performs neural network-based linguistic analysis of normalized input data to build a neuro-linguistic model of the observed input data. The behavior recognition system can use the linguistic model to describe subsequently observed activity. However, rather than describing the activity based on predefined objects and actions, the neuro-linguistic module 215 develops a custom language based on symbols, words, and phrases generated from the input data. As shown, the neuro-linguistic module 215 includes a data transactional memory (DTM) component 216, a classification analyzer component 217, a mapper component 218, a lexical analyzer component 219, and a perceptual associative memory (PAM) component 220.

In one embodiment, the DTM component 216 retrieves the normalized vectors of input data from the sensory memory component 135 and stages the input data in the pipeline architecture provided by the GPU 121. The classification analyzer component 217 evaluates the normalized data organized by the DTM component 216 and maps the data on a neural network. In one embodiment, the neural network is a combination of a self-organizing map (SOM) and an adaptive resonance theory (ART) network.

The mapper component 218 clusters the data streams based on values occurring repeatedly in association with one another. Further, the mapper component 218 generates a set of clusters for each input feature. For example, assuming that the input data corresponds to video data, features may include location, velocity, acceleration etc. The mapper component 218 would generate separate sets of clusters for each of these features. The mapper component 218 identifies symbols (i.e., builds an alphabet of letters) based on the clustered input data. Specifically, the mapper component 218 determines a statistical distribution of data in each cluster. For instance, the mapper component 218 determines a mean, variance, and standard deviation for the distribution of values in the cluster. The mapper component 218 also updates the statistics as more normalized data is received. Further, each cluster may be associated with a statistical significance score. The statistical significance for a given cluster increases as more data is received which maps to that cluster. In addition, the mapper component 218 decays the statistical significance of the cluster as the mapper component 218 observes data mapping to the cluster less often over time.

In one embodiment, the mapper component 218 assigns a set of symbols to clusters having statistical significance. A cluster may have statistical significance if a threshold amount of input data mapping to that cluster is exceeded. A symbol may be described as a letter of an alphabet used to create words used in the neuro-linguistic analysis of the input data. A symbol provides a "fuzzy" representation of the data belonging to a given cluster.

Further, the mapper component 218 is adaptive. That is, the mapper component 218 may identify new symbols corresponding to new clusters generated from the normalized data, as such clusters are reinforced over time (resulting in such clusters reaching a level statistical significance relative to the other clusters that emerge from the input data). The mapper component 218 "learns on-line" and may merge similar observations to a more generalized cluster. The mapper component 218 may assign a distinct symbol to the resulting cluster.

Once a cluster has reached statistical significance (i.e., data observed as mapping to that cluster has reached a threshold amount of points), the mapper component 219 begins sending corresponding symbols to the lexical analyzer component 219 in response to normalized data that maps to that cluster. In one embodiment, the mapper component 218 limits symbols that can be sent to the lexical component 219 to the most statistically significant clusters. In practice, outputting symbols (i.e., letters) assigned to the top thirty-two clusters has shown to be effective. However, other amounts may also prove effective, such as the top sixty-four or 128 most frequently recurring clusters. Note, over time, the most frequently observed symbols may change as clusters increase (or decrease) in statistical significance. As such, it is possible for a given cluster to lose statistical significance. Over time, thresholds for statistical significance can increase, and thus, if the amount of observed data mapping to a given cluster fails to meet a threshold, then the cluster loses statistical significance.

In one embodiment, the mapper component 218 evaluates an unusualness score for each symbol. The unusualness score is based on the frequency of a given symbol relative to other symbols observed in the input data stream, over time. The unusualness score may increase or decrease over time as the neuro-linguistic module 215 receives additional data.

The mapper component 218 sends a stream of the symbols (e.g., letters), timestamp data, unusualness scores, and statistical data (e.g., a representation of the cluster associated with a given symbol) to the lexical analyzer component 219. The lexical analyzer component 219 builds a dictionary based on symbols output from the mapper component 218. In practice, the mapper component 218 may need approximately 5000 observations (i.e., normalized vectors of input data) to generate a stable alphabet of symbols.

The lexical analyzer component 219 builds a dictionary that includes combinations of co-occurring symbols, e.g., words, from the symbols transmitted by the mapper component 218. The lexical analyzer component 219 identifies repeating co-occurrences of letters and features output from the mapper component 218 and calculates frequencies of the co-occurrences occurring throughout the symbol stream. The combinations of symbols may represent a particular activity, event, etc.

In one embodiment, the lexical analyzer component 219 limits the length of words in the dictionary to allow the lexical analyzer component 219 to identify a number of possible combinations without adversely affecting the performance of the computer system 115. Further, the lexical analyzer component 219 may use level-based learning models to analyze symbol combinations and learn words. The lexical analyzer component 219 learns words up through a maximum symbol combination length at incremental levels, i.e., where one-letter words are learned at a first level, two-letter words are learned at a second level, and so on. In practice, limiting a word to a maximum of five or six symbols has shown to be effective.

Like the mapper component 218, the lexical analyzer component 219 is adaptive. That is, the lexical analyzer component 219 may learn and generate words in the dictionary over time. The lexical analyzer component 219 may also reinforce or decay the statistical significance of words in the dictionary as the lexical analyzer component 219 receives subsequent streams of symbols over time. Further, the lexical analyzer component 219 may determine an unusualness score for each word based on how frequently the word recurs in the data. The unusualness score may increase or decrease over time as the neuro-linguistic module 215 processes additional data.

In addition, as additional observations (i.e., symbols) are passed to the lexical analyzer component 219 and identified as a being part of a given word, the lexical analyzer component 219 may determine that the word model has matured. Once a word model has matured, the lexical analyzer component 219 may output observations of those words in the model to the PAM component 219. In one embodiment, the lexical analyzer component 219 limits words sent to the PAM component 320 to the most statistically relevant words. In practice, for each single sample, outputting occurrences of the top thirty-two most frequently occurring words has shown to be effective (while the most frequently occurring words stored in the models can amount to thousands of words). Note, over time, the most frequently observed words may change as the observations of incoming letters change in frequency (or as new letters emerge by the clustering of input data by the mapper component 218.

Once the lexical analyzer component 219 has built the dictionary (i.e., identifies words that have a reached a predefined statistical significance), the lexical analyzer component 219 sends occurrences of words subsequently observed in the input stream to the PAM component 220. The PAM component 220 builds a syntax of phrases with from the words output by the lexical analyzer component 219. In practice, lexical analyzer component 219 may build a useful dictionary of words after receiving approximately 15,000 observations (i.e., input letters from the mapper component 218).

The PAM component 220 identifies a syntax of phrases based on the sequence of words output from the lexical analyzer component 219. Specifically, the PAM component 220 receives the words identified by the lexical analyzer component 219 generates a connected graph, where the nodes of the graph represent the words, and the edges represent a relationship between the words. The PAM component 220 may reinforce or decay the links based on the frequency that the words are connected with one another in a data stream.

Similar to the mapper component 218 and the lexical analyzer component 219, the PAM component 220 determines an unusualness score for each identified phrase based on how frequently the phrase recurs in the linguistic data. The unusualness score may increase or decrease over time as the neuro-linguistic module 215 processes additional data.

Similar to the lexical analyzer component 219, the PAM component 220 may limit the length of a given phrase to allow the PAM component 220 to be able to identify a number of possible combinations without adversely affecting the performance of the computer system 115.

The PAM component 220 identifies syntax phrases over observations of words output from the lexical analyzer component 219. As observations of words accumulate, the PAM component 220 may determine that a given phrase has matured, i.e., a phrase has reached a measure of statistical relevance. The PAM component 220 then outputs observations of that phrase to the cognitive module 225. The PAM component 220 sends data that includes a stream of the symbols, words, phrases, timestamp data, unusualness scores, and statistical calculations to the cognitive module 325. In practice, the PAM component 220 may obtain a meaningful set of phrases after observing about 5000 words from the lexical analyzer component 219.

After maturing, the generated letters, words, and phrases form a stable neuro-linguistic model of the input data that the computer system 115 uses to compare subsequent observations of letters, words, and phrases against the stable model. The neuro-linguistic module 215 updates the linguistic model as new data is received. Further, the neuro-linguistic module 215 may compare a currently observed syntax to the model. That is, after building a stable set of letters, the neuro-linguistic module 215 may build a stable model of words (e.g., a dictionary). In turn, the neuro-linguistic module 215 may be used to build a stable model of phrases (e.g., a syntax). Thereafter, when the neuro-linguistic module 215 receives subsequently normalized data, the module 215 can output an ordered stream of symbols, words, and phrases, all of which can be compared to the stable model to identify interesting patterns or detect deviations occurring in the stream of input data.

As shown, the cognitive module 226 includes a workspace 226, a semantic memory 230, codelet templates 235, episodic memory 240, long term memory 245, and an anomaly detection component 250. The semantic memory 230 stores the stable neuro-linguistic model described above, i.e., a stable copy from the mapper component 218, lexical analyzer component 219, and the PAM component 220.

In one embodiment, the workspace 226 provides a computational engine for the machine learning engine 140. The workspace 226 performs computations (e.g., anomaly modeling computations) and stores immediate results from the computations.

The workspace 226 retrieves the neuro-linguistic data from the PAM component 220 and disseminates this data to different portions of the cognitive module 225 as needed.

The episodic memory 240 stores linguistic observations related to a particular episode in the immediate past and may encode specific details, such as the "what" and the "when" of a particular event.

The long-term memory 245 stores generalizations of the linguistic data with particular episodic details stripped away. In this way, when a new observation occurs, memories from the episodic memory 240 and the long-term memory 245 may be used to relate and understand a current event, i.e., the new event may be compared with past experience (as represented by previously observed linguistic data), leading to both reinforcement, decay, and adjustments to the information stored in the long-term memory 245, over time. In a particular embodiment, the long-term memory 245 may be implemented as an ART network and a sparse-distributed memory data structure. Importantly, however, this approach does not require events to be defined in advance.

The codelet templates 235 provide a collection of executable codelets, or small pieces of code that evaluate different sequences of events to determine how one sequence may follow (or otherwise relate to) another sequence. The codelet templates 325 may include deterministic codelets and stochastic codelets. More generally, a codelet may detect interesting patterns from the linguistic representation of input data. For instance, a codelet may compare a current observation (i.e., a current phrase instance with what has been observed in the past) with previously observed activity stored in the semantic memory 230. By repeatedly scheduling codelets for execution, copying memories and percepts to/from the workspace 226, the cognitive module 225 performs a cognitive cycle used to observe, and learn, about patterns of behavior that occur within the linguistic data.

The anomaly detection component 250 evaluates unusualness scores sent by the neuro-linguistic module 215 to determine whether to issue an alert in response to some abnormal activity indicated by the unusualness scores. Specifically, the anomaly detection component 250 is provides probabilistic histogram models (e.g., an unusual lexicon score model, an unusual syntax score model, and an anomaly model) which represent the unusualness scores. The unusual lexicon score model and unusual syntax score model are generated based on unusualness scores sent from the lexical analyzer component 219 and the PAM component 220. The anomaly model receives input percentiles from the unusual lexicon score model and unusual syntax score model and generates an absolute unusualness score based on the percentiles. The anomaly detection component 250 evaluates the scores and determines whether to send an alert based on a given score. The anomaly detection component 250 may send alert data to an output device, where an administrator may view the alert, e.g., via a management console.

The cognitive module 225 performs learning analysis on the linguistic content delivered to semantic memory 230 (i.e., the identified symbols, words, phrases) by comparing new observations to the learned patterns in the stable neuro-linguistic model kept in semantic memory 230 and then estimating the rareness of these new observations.

Specifically, the anomaly detection component 250 evaluates the unusualness scores of each of the symbols, words, and phrases to identify abnormal occurrences in the observed data. Once an anomalous observation has been identified, the anomaly component may issue an alert (e.g., notify an administrator or user of the computer system 115).

Figure 3:
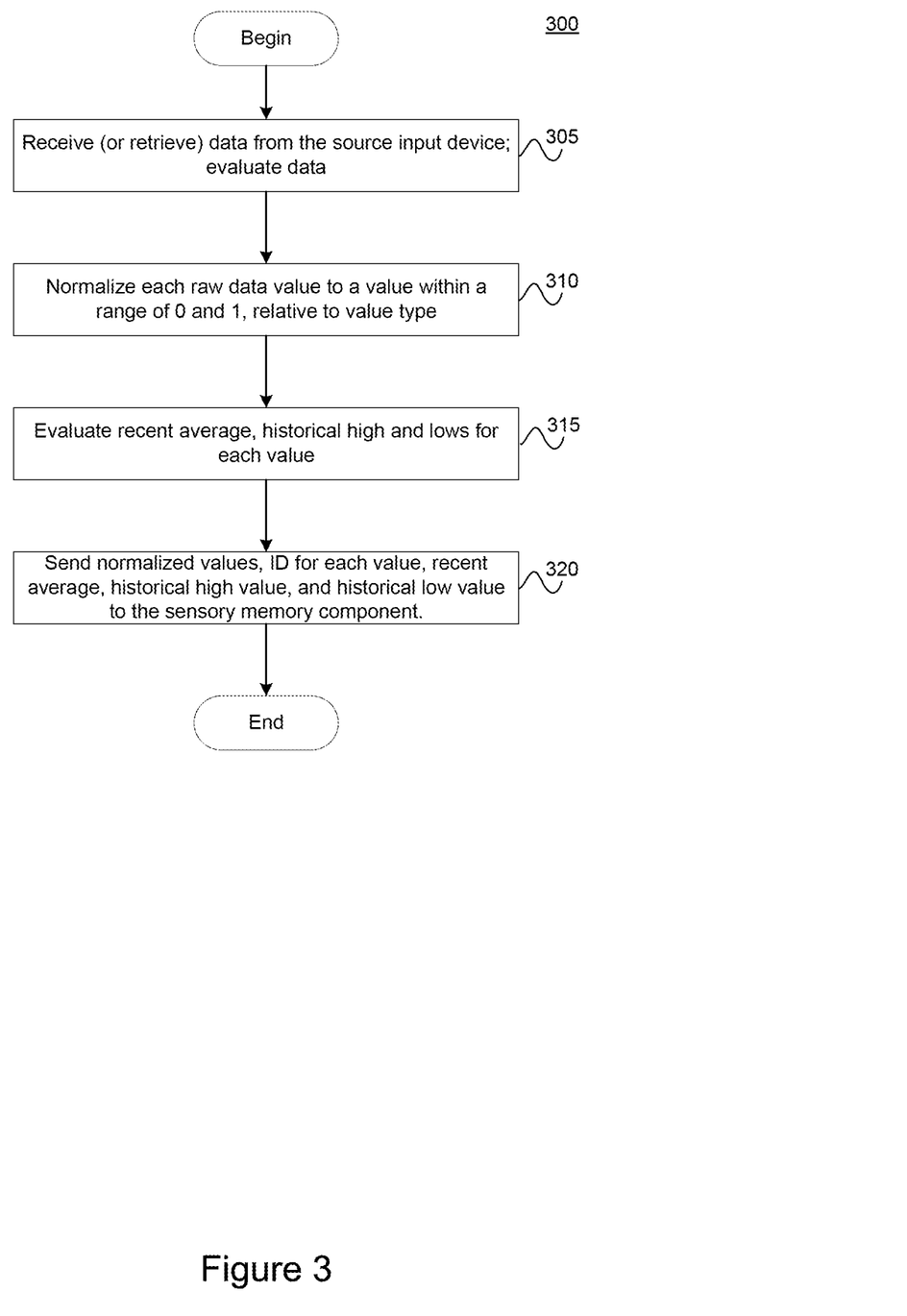
FIG. 3 illustrates a method for collecting sensor data for use in a neuro-linguistic behavior recognition system, according to one embodiment.

FIG. 3 illustrates a method 300 for collecting sensor data for use in a neuro-linguistic behavior recognition system, according to one embodiment. More specifically, method 300 describes a method for a data collector to retrieve data from an associated input device and send the data to the neuro-linguistic module 215. For this example, assume that a data collector module 202 is a video source capturing image data at a given frame rate. Of course, a variety of data collector components 202 can be used.

Method 300 begins at step 305, where the data collector module 202 retrieves (or receives) data from the source input device. In this case, the data collector module 202 may retrieve video frames from a video source, such as a video camera positioned to observe a particular location, such as a hotel lobby. Further, the data collector module 202 identifies data values to send to the sensory memory component 135. To do so, the data collector module 202 may evaluate the video frames to separate foreground objects from background objects, measure appearance and kinematic information of the identified foreground objects, and track foreground objects moving across the scene (i.e., the field of view of the camera). As a result, the data collector module 202 generates a set of data values characterizing appearance and kinematic aspects of the objects depicted in video frames.

At step 310, the data collector module 202 normalizes each data value to a numerical value falling within a range, e.g., between 0 to 1, inclusive, relative to the type of that data value. For example, values associated with kinematic features are normalized from 0 to 1 relative to other values associated with kinematic features. Doing so converts each value to a common format and allows the neuro-linguistic module 215 to recognize recurring events in the video stream.

After normalizing the values, at step 315, the data collector module 202 identifies additional data associated with the normalized values, such as a timestamp of a given value, an average associated with the data type (e.g., kinematic features, appearance features, location, position, etc.) of the value, and historical high and low values for that data type. Doing so allows the data collector module 202 to readjust the normalization in the event that the video source is modified. Specifically, the data collector module 202 references the identified historical values and averages to readjust the normalization.

At step 320, the data collector module 202 sends a vector of the normalized values and associated data to the sensory memory component 135. As stated, the sensory memory component 135 stores the normalized values and associated data. The neuro-linguistic module 215 may then retrieve the normalized values from the sensory memory component 135 and perform linguistic analysis thereafter.

Figure 4:
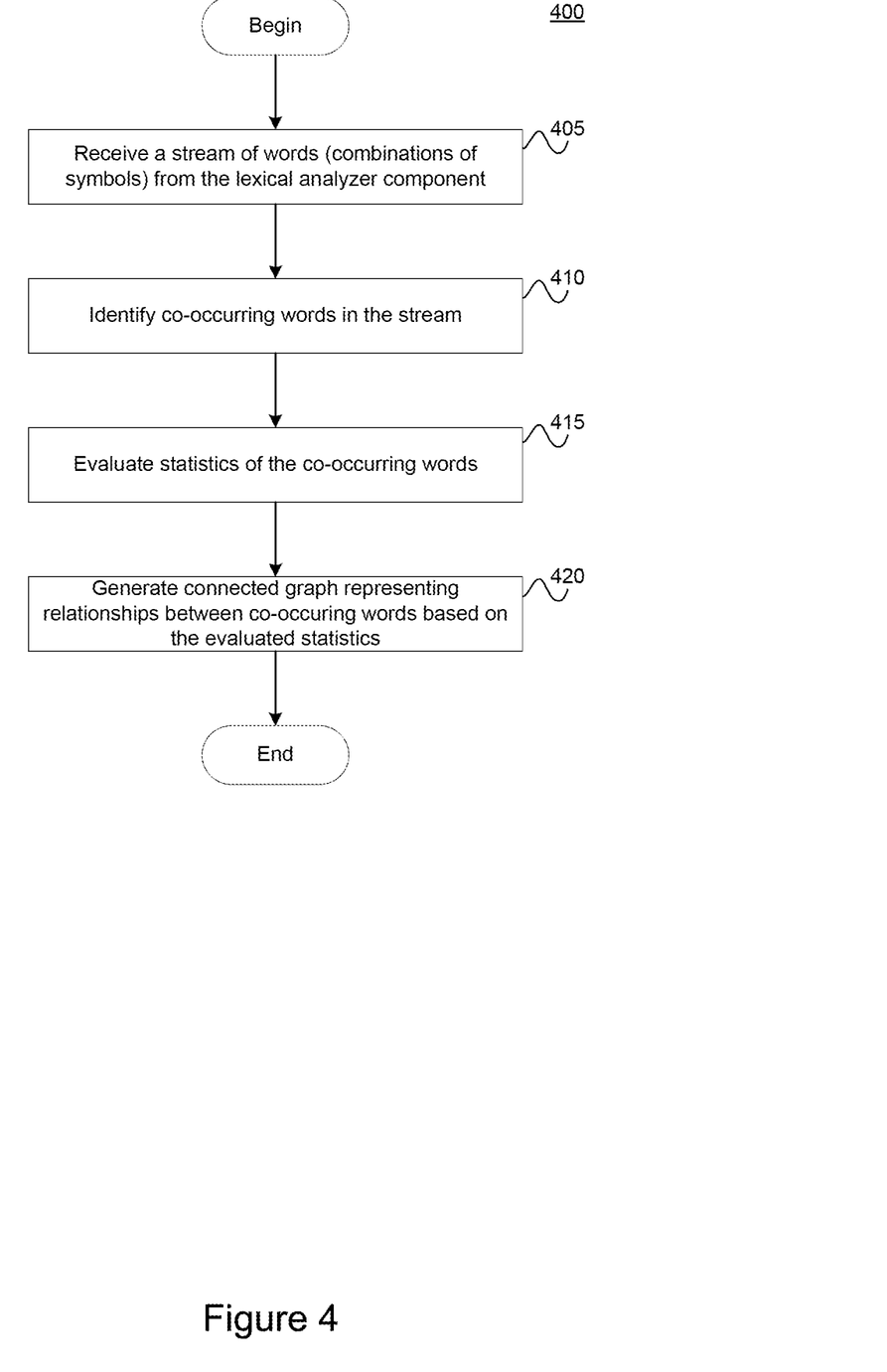
FIG. 4 illustrates a method for initializing a perceptual associative memory, according to one embodiment.

FIG. 4 illustrates a method 400 for initializing the PAM component 220, according to one embodiment. Method 400 begins at step 405, where the PAM component 220 receives a stream of observations of words from the lexical analyzer component 219. As stated, the lexical analyzer component 219 generates the words by evaluating the statistical frequency of groups of symbols as output by the mapper component 218. As groups of symbols (again words) appear, the lexical analyzer component 219 identifies statistically relevant combinations of symbols, i.e., words, and outputs the words to the PAM component 220. As stated, the symbols, words, and phrases are identified to build a statistical model of the frequency for the symbols, words, and phrases as commonly observed, i.e., statistically relevant, in the stream.

At step 410, the PAM component 220 evaluates statistics of the co-occurring words. Such statistics may include how often the PAM component 220 observes each word co-occuring with the other. In one embodiment, the statistics may include a statistical significance score determined by how frequently a given word co-occurs with another word passed in by the lexical analyzer component 219. To determine how frequently each word is observed with one another, the PAM component 220 may generate a matrix that arranges each of the words based on co-occurrence.

At step 420, the PAM component 220 generates a connected graph. Each node in the connected graph represents one of the words output by the lexical component 219. Undirected edges connect nodes to indicate a relationship between the words that co-occur with a relative frequency. Further, the edges may be weighted based on the statistical significance score between words. Strings of connected nodes may represent phrases that the behavior recognition system uses to describe data input to the neuro-linguistic module 210, clustered into symbols (by the mapper component 217) and parsed into words (by the lexical component).

Over time, the PAM component 220 can receive additional observations of words from the lexical analyzer component 219. The PAM component 220 may reinforce a given edge as the statistical significance score increases, e.g., as the PAM component 220 observes subsequent instances of two words co-occurring with one another. In addition, the PAM component 220 may eliminate the edge as fewer observations occur over time (i.e., as the statistical significance score decreases over time).

Figure 5:
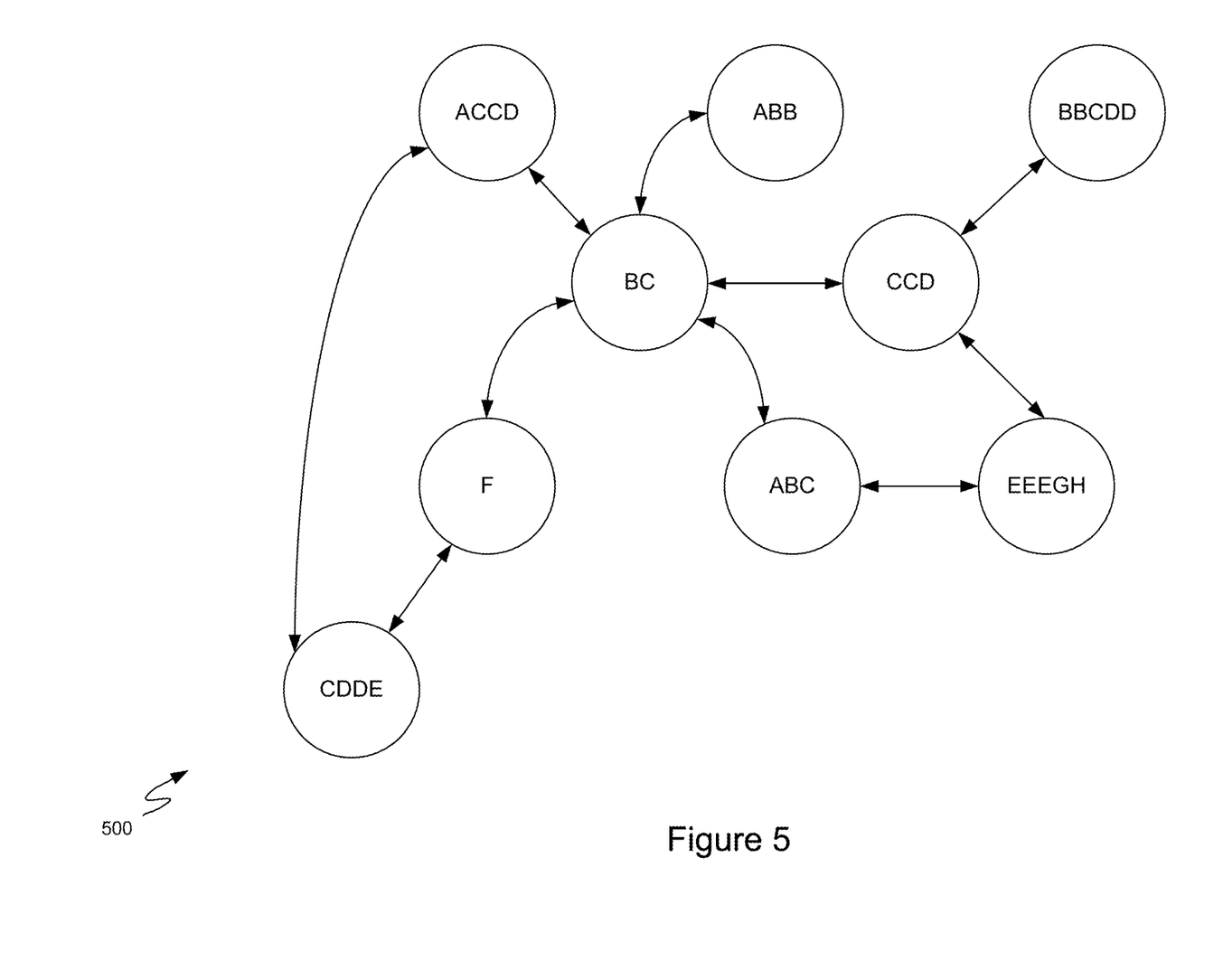
FIG. 5 illustrates a connected graph representing relationships between words from a dictionary input into a perceptual associative memory, according to one embodiment.

FIG. 5 illustrates an example connected graph 500 generated by the PAM component 220, according to one embodiment. When the lexical analyzer component 219 initially outputs a stream of words to the PAM component 220, the PAM component 220 generates the connected graph 500.

The nodes (represented by the circles) represent identified words sent by the lexical analyzer component 219. The undirected edges connecting the nodes represent that the PAM component 220 has observed the connected words to co-occur in the stream of words. Further, the edges may be weighted based on a statistical significance score between two co-occurring words. In addition, the PAM component 220 may reinforce or decay the edges based as the statistical significance score increases or decreases, respectively. For example, the statistical significance score may increase if the PAM component 220 observes further co-occurrences between two words. The PAM component 220 can reinforce the edge connecting both words in the graph as a result of the increase.

The graph 500 establishes a syntax of phrases identified by the PAM component 220. A phrase is a sequence of words that may occur in the word stream based on probabilistic relationships of each word appearing in the order of a given phrase (a given path through the connected graph). The PAM component 220 outputs phrases observed in the stream of words output by the mapper having co-occurring words with a statistical significance score exceeding a given threshold. Further, the PAM component 220 may send metadata characterizing phrases output by the PAM component 220 to the cognitive module 225. For example, the PAM component 200 may include metadata from the mapper component 218 and the lexical analyzer component 219, such as symbols, words, and associated statistics sent by the mapper component 218 and the lexical analyzer component 219. Collectively, the symbols, words, phrases, along with all the metadata related to the frequencies at which the symbols, words, and phrases are observed and the scoring assigned by the mapper and lexical analyzer components form a neuro-linguistic model describing the input data. In turn, the cognitive module 225 analyzes the neuro-linguistic model to interpret incoming data, e.g., in identifying normal and abnormal behavior.

Figure 6:
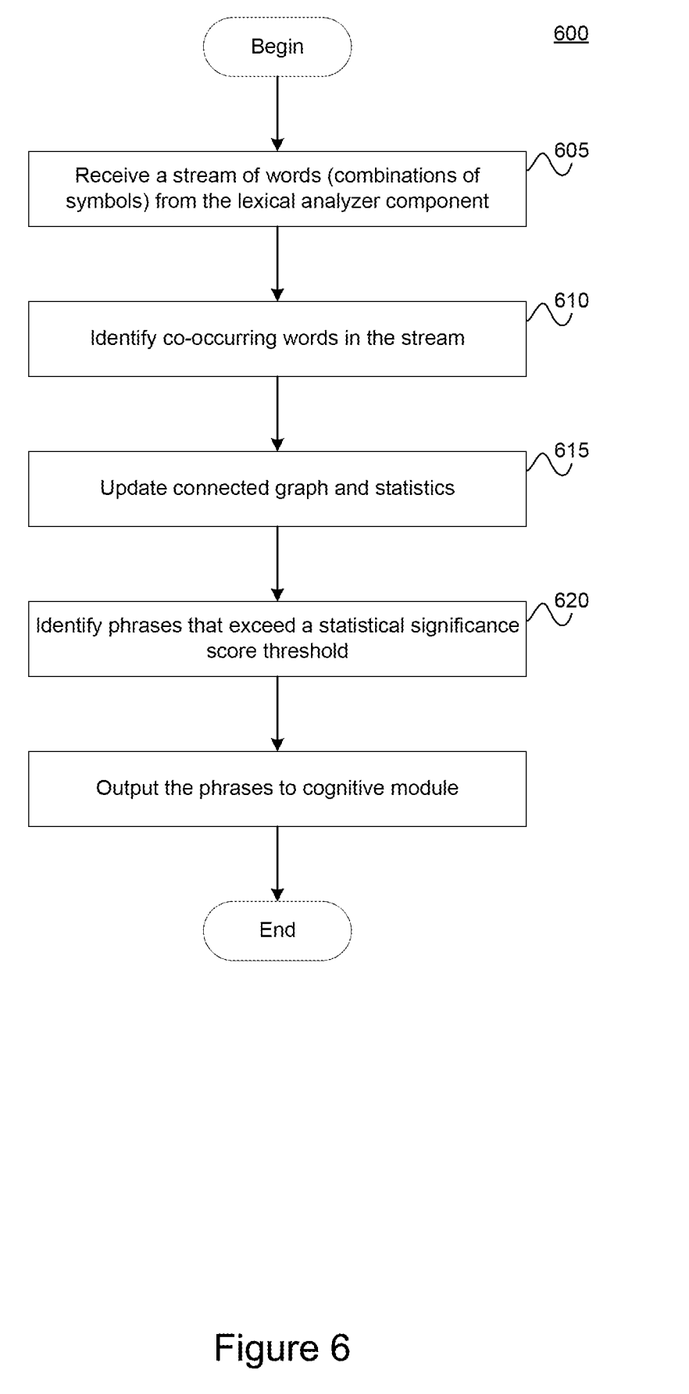
FIG. 6 illustrates a method for sending a syntax to a cognitive module, according to one embodiment.

FIG. 6 illustrates a method 600 for sending phrases observed by the PAM component (in a word-stream supplied by the lexical component) to the cognitive module 225, according to one embodiment. Specifically, method 600 describes how the PAM component 220 processes incoming words from the lexical analyzer component 219 after initialization, i.e., after initially generating the fully connected graph. Method 600 begins at step 605, where the PAM component 220 begins receiving a stream of observations of words from the lexical analyzer component 219. The PAM component 220 observes co-occurrences between the words received, e.g., a word A is situated next to a word B in the stream. The PAM component 220 may also identify newly co-occurring words with the input.

At step 610, the PAM component 220 updates co-occurrence statistics associated with each observation in the stream. For instance, the PAM component 220 may increase a statistical significance score for a pair of co-occurring words if observed in the stream. As another example, a pair of words previously not observed to co-occur may be observed to co-occur in the stream. If so, the PAM component 220 increases a statistical significance score for the pair of words.

At step 615, the PAM component 220 updates the fully connected graph. For example, the PAM component 220 may reinforce edges at portions of the graph where the statistical significance score increased. Further, the PAM component 220 may add edges to observed pairs that have reached statistical relevance (e.g., the statistical significance score has exceeded a threshold).

At step 620, the PAM component 220 outputs phrases with co-occurring words having a statistical significance score that exceeds a given threshold. Exceeding such a threshold may indicate that a given phrase is matured and may be sent to the cognitive module 225. In addition, the PAM component 220 may also send symbols, words, and associated statistics to accompany the phases. As stated, such symbols, words, and phrases form a neuro-linguistic model that the behavior recognition systems uses to describe input data.

One embodiment of the present disclosure is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the present disclosure may be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the present disclosure should not be limited to use solely in any specific application identified and/or implied by such nomenclature.

As described, embodiments herein provide techniques for determining a syntax based on a dictionary of words that represents data input from a source (e.g., video source, SCADA source, network security source, etc.) via a neuro-linguistic behavior recognition system. The symbols, words, and syntax form the basis for a linguistic model used to describe input data observed by the behavior recognition system. The behavior recognition system analyzes and learns behavior based on the linguistic model to distinguish between normal and abnormal activity in observed data. Advantageously, this approach does not relying on predefined patterns to identify behaviors and anomalies but instead learns patterns and behaviors by observing a scene and generating information on what it observes.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    receiving a plurality of video frames from a video source, the plurality of video frames including a representation of an object;
    normalizing, via at least one processor, data in each video frame from the plurality of video frames to obtain normalized data for the plurality of video frames;
    generating, via the at least one processor and based on the normalized data, a syntax for a neuro-linguistic model, the syntax including a stable model of phrases, the generating the syntax including generating a connected graph having a plurality of nodes, each node from the plurality of nodes representing one machine-readable word from a plurality of machine-readable words having an associated predefined maximum symbol combination length;
    identifying, via the at least one processor, instances of at least one machine-readable phrase from the stable model of phrases and based on the connected graph and a phrase length limit;
    calculating, via the at least one processor, an unusualness score for an observation of a first machine-readable phrase from the at least one machine-readable phrase identified in the connected graph; and
    publishing, via the at least one processor, an alert associated with the observation of the first machine-readable phrase, the alert indicating an anomaly in the behavior of the object.

2. The computer-implemented method of claim 1, wherein generating the syntax includes:
    generating, via the at least one processor, a plurality of machine-readable symbols from the normalized data, each machine-readable symbol from the plurality of machine-readable symbols being associated with a distinct cluster of the normalized data, and
    building a dictionary of machine-readable words based on an observed sequence of the plurality of machine-readable symbols.

3. The computer-implemented method of claim 1, wherein generating the syntax includes:
    evaluating, via the at least one processor, statistics for a plurality of combinations of machine-readable words co-occurring in the plurality of machine-readable words, the statistics including a frequency at which combinations of machine-readable words from the plurality of combinations of machine-readable words co-occur; and
    updating, via the at least one processor, a model of combinations of machine-readable words based on the evaluated statistics, the model identifying statistically relevant observations of co-occurring machine-readable words.

4. The computer-implemented method of claim 1, wherein the connected graph further includes a plurality of edges, each edge from the plurality of edges connecting the nodes representing a probabilistic measure of co-occurrence of pairs of statistically relevant words in the plurality of machine-readable words.

5. The computer-implemented method of claim 1, wherein the connected graph further includes a plurality of edges, each edge from the plurality of edges weighted based on a statistical significance score between each pair of nodes from the plurality of nodes.

6. The computer-implemented method of claim 1, further comprising:
    receiving the plurality of machine-readable words; and
    updating statistics of the co-occurring words based on the plurality of machine-readable words.

7. The computer-implemented method of claim 1, wherein generating the syntax includes generating a dictionary of machine-readable words based on an observed sequence of the machine-readable symbols, the method further comprising at least one of:

decreasing a statistical significance score of co-occurring machine-readable words, from the dictionary of machine-readable words, that are less frequently observed over time; or increasing a statistical significance score of co-occurring machine-readable words, from the dictionary of machine-readable words, that are more frequently observed over time.

8. A non-transitory computer-readable storage medium storing instructions that, when executed by a processor, cause the processor to:
receive a plurality of video frames from a video source, the plurality of video frames including a representation of an object;
normalize, via at least one processor, data in each video frame from the received plurality of video frames to obtain normalized data for the plurality of video frames;
generate, via the at least one processor and based on the normalized data, a syntax for a neuro-linguistic model, the syntax including a stable model of phrases, the instructions to generate the syntax including instructions to generate a connected graph having a plurality of nodes, each node from the plurality of nodes representing one machine-readable word from a plurality of machine-readable words having an associated predefined maximum symbol combination length;
identify, via the at least one processor, instances of at least one machine-readable phrase from the stable model of phrases and based on the connected graph and a phrase length limit;
calculate, via the at least one processor, an unusualness score for an observation of a first machine-readable phrase from the at least one machine-readable phrase identified in the connected graph; and
publish, via the at least one processor, an alert associated with the observation of the first machine-readable phrase, the alert indicating an anomaly in the behavior of the object.

9. The non-transitory computer-readable storage medium of claim 8, wherein the instructions to generate the syntax include instructions to:
generate a plurality of machine-readable symbols from the normalized data, each machine-readable symbol from the plurality of machine-readable symbols being associated with a distinct cluster of the normalized data, and
build a dictionary of machine-readable words based on an observed sequence of the plurality of machine-readable symbols.

10. The non-transitory computer-readable storage medium of claim 8, wherein the instructions to generate the syntax include instructions to:
evaluate statistics for a plurality of combinations of machine-readable words co-occurring in the plurality of machine-readable words, the statistics including a frequency at which combinations of machine-readable words from the plurality of combinations of machine-readable words co-occur; and
update a model of combinations of machine-readable words based on the evaluated statistics, the model identifying statistically relevant observations of co-occurring machine-readable words.

11. The non-transitory computer-readable storage medium of claim 8, wherein the connected graph further includes a plurality of edges, each edge from the plurality of edges connecting the nodes representing a probabilistic measure of co-occurrence of pairs of statistically relevant words in the plurality of machine-readable words.

12. The non-transitory computer-readable storage medium of claim 8, wherein the connected graph also includes a plurality of edges, each edge from the plurality of edges weighted based on a statistical significance score between each pair of nodes from the plurality of nodes.

13. The non-transitory computer-readable storage medium of claim 8, further storing instructions that, when executed by the processor, cause the processor to:
receive the plurality of machine-readable words; and
update statistics of the co-occurring words based on the plurality of machine-readable words.

14. The non-transitory computer-readable storage medium of claim 8, wherein the instructions to generate the syntax include instructions to generate a dictionary of machine-readable words based on an observed-sequence of the machine-readable symbols, the non-transitory computer-readable storage medium further storing instructions that, when executed by the processor, cause the processor to:
decrease a statistical significance score of co-occurring machine-readable words, from the dictionary of machine-readable words, that are less frequently observed over time; or
increase a statistical significance score of co-occurring machine-readable words, from the dictionary of machine-readable words, that are more frequently observed over time.

15. A system, comprising:
a processor; and
a memory storing processor-executable instructions that, when executed by the processor, cause the processor to:
receive a plurality of video frames from a video source, the plurality of video frames including a representation of an object;
normalize, via at least one processor, data in each video frame from the received plurality of video frames to obtain normalized data for the plurality of video frames;
generate, via the at least one processor and based on the normalized data, a syntax for a neuro-linguistic model, the syntax including a stable model of phrases, the instructions to generate the syntax including instructions to generate a connected graph having a plurality of nodes, each node from the plurality of nodes representing one machine-readable word from a plurality of machine-readable words having an associated predefined maximum symbol combination length;
identify, via the at least one processor, instances of at least one machine-readable phrase from the stable model of phrases and based on the connected graph and a phrase length limit;
calculate, via the at least one processor, an unusualness score for an observation of a first machine-readable phrase from the at least one machine-readable phrase identified in the connected graph; and
publish, via the at least one processor, an alert associated with the observation of the first machine-readable phrase, the alert indicating an anomaly in the behavior of the object.

16. The system of claim 15, wherein the instructions to generate the syntax include instructions to:
generate a plurality of machine-readable symbols from the normalized data, each machine-readable symbol from the plurality of machine-readable symbols being associated with a distinct cluster of the normalized data, and build a dictionary of machine-readable words based on an observed sequence of the plurality of machine-readable symbols.

17. The system of claim 15, wherein the instructions to generate the syntax include instructions to:

evaluate statistics for a plurality of combinations of machine-readable words co-occurring in the plurality of machine-readable words, the statistics including a frequency at which combinations of machine-readable words from the plurality of combinations of machine-readable words co-occur; and update a model of combinations of machine-readable words based on the evaluated statistics, the model identifying statistically relevant observations of co-occurring machine-readable words.

18. The system of claim 15, wherein the connected graph further includes a plurality of edges, each edge from the plurality of edges connecting the nodes representing a probabilistic measure of co-occurrence of pairs of statistically relevant words in the plurality of machine-readable words.

19. The system of claim 15, wherein the connected graph further includes a plurality of edges, each edge from the plurality of edges weighted based on a statistical significance score between each pair of nodes from the plurality of nodes.

20. The system of claim 15, wherein the memory further stores instructions that, when executed by the processor, cause the processor to:

receive the plurality of machine-readable words; and
update statistics of the co-occurring words based on the plurality of machine-readable words.

* * * * *